Sept. 28, 1965 H. O. ANGER 3,209,201
BEAM POSITION IDENTIFICATION MEANS
Filed June 17, 1960 2 Sheets-Sheet 1

INVENTOR.
Hal O. Anger
Attorney

INVENTOR.
Hal O. Anger

United States Patent Office 3,209,201
Patented Sept. 28, 1965

3,209,201
BEAM POSITION IDENTIFICATION MEANS
Hal O. Anger, 2032 E. 30th St., Oakland, Calif.
Filed June 17, 1960, Ser. No. 36,969
6 Claims. (Cl. 315—9)

The invention relates to beam targets which emit signals in response to beam excitation suitable for plotting the location of the beam on the target, the present invention having as one of its applications a radiation or scintillation camera such as described in my copending application Serial No. 706,825, filed January 2, 1958, for Radioactivity Distribution Detector, now Patent No. 3,011,057.

An object of the present invention is to provide a target responding to a stimulus, such as a beam of light, or other radiant energy, charged particles, or the like, and emitting signals corresponding with the location of the zone of stimulus on the target, the target being of simplified construction and providing substantially error-free operation to produce the desired locating signals.

Another object of the present invention is to provide a target as above described and adapted for responding to and locating a stimulus such as that produced by a single radiation particle or quantum of energy impinging thereon.

The invention possesses other objects and features of advantage, some of which of the foregoing will be set forth in the following description of the preferred form of the invention which is illustrated in the drawings accompanying and forming part of this specification. It is to be understood however, that variations in the showing made by the said drawings and description may be adopted within the scope of the invention as set forth in the claims.

Referring to said drawings.

Figure 2:
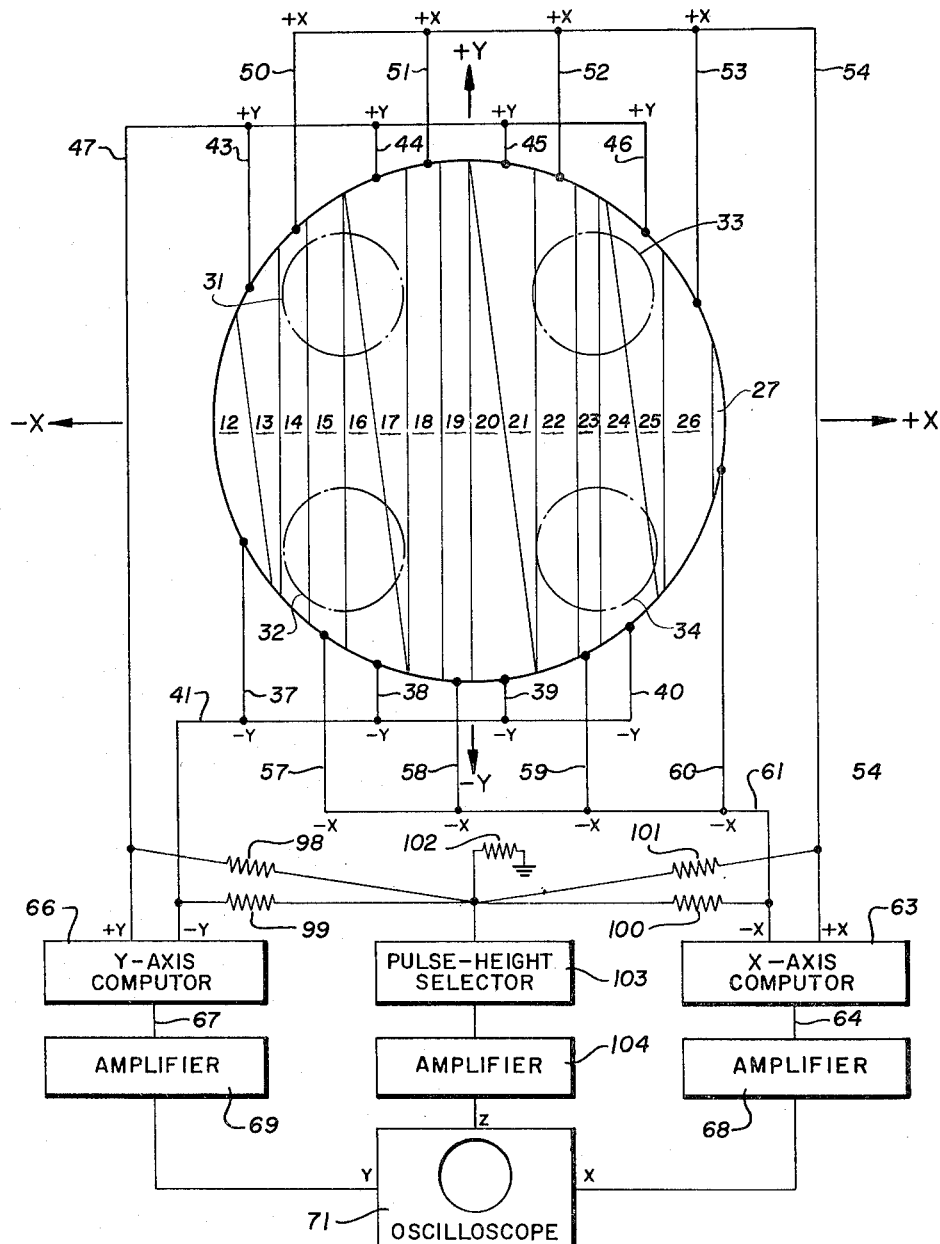
FIGURE 2 is a diagrammatic layout of a portion of the apparatus shown in FIGURE 2 and the associated electrical circuits.

The beam position identification means of the present invention consists briefly of a beam excitable, electric signal-producing target 11, and electric circuit means, see FIGURE 2, connected thereto, wherein the target 11 is formed and co-functions with the circuit means to provide a coordinate sensing of the position of the beam on the target. In the present construction, the target 11 consists of a focal plane member which is subdivided into a geometrical pattern of segments or elements which are diagrammatically illustrated in FIGURE 2 as segments 12, 13, 14, 15, 16, 17, 18, 19, 20, 21, 22, 23, 24, 25, 26 and 27, and which are voltage or current responsive to an energizing beam or spot, as for example beams identified in FIGURE 2 by circles 31, 32, 33 and 34, and the segments are so shaped and connected as to provide output signals capable of determining both the intensity and location of the beam on the target face.

The elements 12–27 are relatively small in respect to the exciting beam, the position of which is to be resolved, whereby a plurality of the elements will always be simultaneously excited. Certain of the elements, as for example elements 14, 15, 18, 19, 22, 23, 26 and 27 are formed to provide a collective output signal which varies as a function of beam excitation taken along a horizontal or X coordinate axis. Others of the elements, for example elements 12, 13, 16, 17, 20, 21, 24 and 25 are formed to provide a collective output signal which varies as a function of beam excitation taken along a vertical or Y coordinate axis. These two collective signals may thus be used to establish the beam position on the target. Improved definition is obtained by arranging the elements 12–27 in regularly interspersed pairs of X and Y elements with each pair consisting of a plus and a minus element, for example, elements 12 and 13 comprise a pair of Y elements with element 12 being a minus Y element and element 13 being a plus Y element. Adjacent this pair of elements are a pair of X elements 14 and 15 in which element 14 is a plus X element, and element 15 is a minus X element. These four elements make up a module which is repeated across the face of the target. Elements 16 and 17 are next adjacent minus and plus Y elements, and elements 18 and 19 are next adjacent plus and minus X elements. These elements are so labelled in FIGURE 2 and it will be seen that reading further across a portion of the target face illustrated element 20 is a minus Y element, element 21 is a plus Y element, elements 22 and 23 are adjacent plus and minus X elements, elements 24 and 25 are adjacent minus and plus Y elements, and elements 26 and 27 are adjacent plus X and minus X elements.

The target 11 in actual practice is, of course, much larger than that illustrated diagrammatically in FIGURE 2 and the elements are much smaller. For example, one practical arrangement for beams having a size of approximately one inch diameter is to provide six modules to the inch, with each module being composed of four sections, viz., plus and minus Y and plus and minus X elements as above explained so that the beam will overlie approximately 24 elements in each of its positions over the target face. The exaggerated illustration depicted in FIGURE 2 is used for purposes of illustration since it is not feasible to attempt to illustrate the individual sections or elements in their normal size. The target may be composed of a plate 36 of glass or other electrical insulation material having a thin metal target face 11 deposited thereon, as by evaporative or plating processes and with the several elements 12–27 separated from each other as by imposing a grid in the metal depositing processes or by photoetching. In this manner all of the elements are electrically separated from each other. A separate electrical connection is made with each of the elements. All of the elements of the same type are electrically connected together. For example, with reference to FIGURE 2 it will be seen that the minus Y elements 12, 16, 20 and 24 are connected by leads 37, 38, 39 and 40 to a common minus Y conductor 41. In a similar fashion the plus Y elements 13, 17, 21 and 25 are connected by leads 43, 44, 45 and 46 to a common plus Y conductor 47. The plus X elements 14, 18, 22 and 26 are here connected by leads 50, 51, 52 and 53 to a common plus X conductor 54. The minus X elements 15, 19, 23 and 27 are here connected by leads 57, 58, 59 and 60 to a common minus X conductor 61.

As will be seen from FIGURE 2, the X elements are formed with a progressive change in width along the X coordinate and the Y elements are formed with a progressive change in width along the perpendicular Y coordinate. For example, the plus X elements increase in width in the direction of movement across the target in a plus Y direction, see for example the progressive widening out of elements 14, 18, 22 and 26. In a similar manner but opposite in sign the minus X elements widen out progressively across the target in a minus X direction, see for example element 27 (incomplete in FIGURE 2) and a progressive widening of elements 23, 19 and 15. The progressive change in width of the Y elements is obtained by forming these elements with converging sides. Each adjacent pair of Y elements is divided by a diagonal line which arranges the two elements as mating triangles, best seen in the case of pairs 16 and 17, 20 and 21, and 24 and 25. Thus, the plus Y elements increase in width in a plus Y direction and the minus Y elements decrease in width in a minus Y direction.

The image resolving function of the sections will now be clear with reference to the various beam positions 31, 32, 33 and 34 illustrated in FIGURE 2, bearing in mind that the individual elements are very much smaller than those illustrated for purpose of description. In beam position 31 there is a preponderance of plus Y signal and a preponderance of minus X signal as the beam is in the plus Y and minus X quadrant. In beam position 32 there will be a perponderance of minus Y signal and minus X signal since the beam is in the minus X, minus Y quadrant. In beam position 33 there will be preponderance of plus Y and plus X signal and it will be noted that the beam is in the plus X and plus Y quadrant. When the beam shifts to position 34 in the plus X, minus Y quadrant it will be seen that the minus Y signal component increases by reason of the broadening out of element 24 and the plus X component is supplied by element 22 which is somewhat broader at this point than adjacent minus X element 23. In the actual target as above explained, the individual elements are much smaller than those illustrated in FIGURE 2 although the general concept and operation of the device can be readily depicted in the segment arrangement illustrated. In the actual target the tapered or diagonal lines between the adjacent Y elements run all the way across the target face.

The target 11 may be formed to respond to various types of beams. For example, with the target sections made of photocathode material, electric signal response can be obtained to a light beam. In the present construction the beam is a beam of charged particles (electrons), and the target face is made of electrically conducting material. In either case, however, the output signals serve to resolve the beam center on the target face.

The composite minus X signal and the composite plus X signal are fed by leads 61 and 54 to an X axis computer 63, which compares the two signals and emits an X axis position signal, as through output lead 64, indicating the position of the beam along the X axis. The X axis computer 63 may be either of a type that produces an output signal proportional to the arithmetic difference between the values of the two input signals, or of a type that computes the ratio, both types being well known in the computer art. This arrangement has been found to be of advantage for providing the X axis location signal with a suitable range of magnitude, since the plus X signal from lead 54 tends to increase as the minus X signal from lead 61 decreases, and vice versa, because of the opposite orders in which the plus X and minus X elements vary in width. The composite plus Y signal and the composite minus Y signal are fed by conductors 47 and 41 to a Y axis computer 66 similar to the computer 63 and having an output line 67 producing the Y axis locating signal for the beam.

The X signal and Y signal leads 64 and 67 are further connected through respective amplifiers and to the X and Y input terminals respectively of an oscilloscope 71, for producing a spot of light upon the oscilloscope screen with a local coordinate position thereon corresponding to the coordinate position of the beam on the target face 11.

Figure 1:
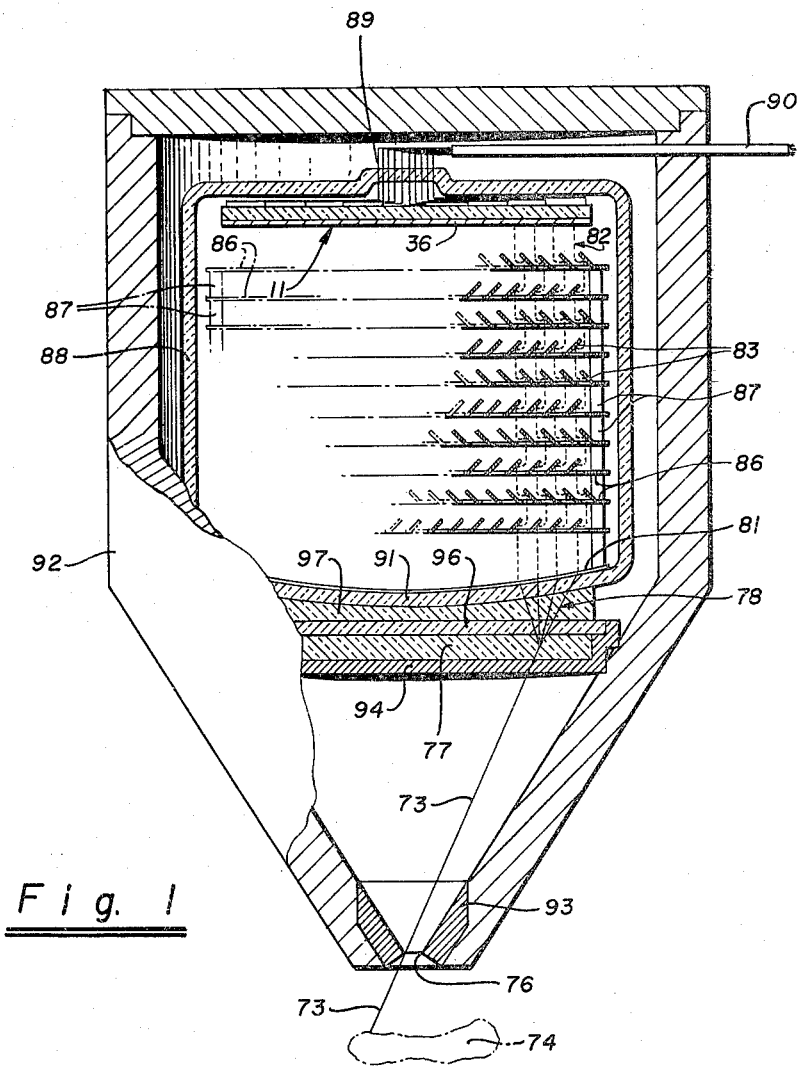
FIGURE 1 is a broken-away elevation view of a radiation camera including a plotting target constructed in accordance with the present invention.

With reference to FIGURE 1, the target is arranged to respond to radiation stimuli, such as a single incident gamma ray 73 proceeding from an object such as a human thyroid gland 74 containing radioactive $I^{131}$. As here shown, rays 73 are focused through a "pinhole" aperture 76 onto a scintillator 77 such as is described in my above-noted copending application, and functioning to accept stimuli such as the gamma ray 303 at various points and to emit a surge of light 78 in response thereto. A photocathode 81 is mounted adjacent to the scintillator 77 and functioning to receive the light 78 and to emit an electron beam 82 in response thereto. In order to amplify the beam 82 in strength, a charged-particle multiplying means, here shown as an array of "Venetian blind" electron-multiplying dynodes 83 is disposed between the photocathode 81 and the target 11. These are provided as pressed out tongues in a series of plates 86 stacked with interpositioned insulators 87 in an evacuated glass tube 88 having an upper centered plug portion for interior electrical leads connected to the various target elements and to the Venetian blind dynodes 83, and for suitable exterior or electrical leads 90 leading to the exterior circuits as shown in FIGURE 2. The photocathode 81 is formed as a thin layer of photocathode material on the inner side of the lower face 91 of the tube 88. It will be recognized that the tube 88 with its interior components and associated exterior circuitry, forms an assembly that is in effect a target as broadly described above and responding to a beam of light (for example, the surge 78) to locate the center of intensity of the beam with respect to coordinates of the lower face 91 of the tube.

The tube 88 is here shown as mounted in a radiation-shielding housing 92, formed for example of metallic lead, and having a lower interchangeable inset portion 93 defining the pinhole aperture 76 for passage of the radiation 73 from various parts of the subject 74 to form an image of the subject on the scintillator 77, the tube and circuits above described co-functioning to plot a spot of light for each radiation particle on the screen of the oscilloscope 71 to form an image of the subject that may be readily observed or photographed. The scintillator 77 is enclosed in a mounting dish 94 which is secured to the inner sides of the housing 92, and is covered with a transparent cover 96. A tube-supporting transparent spacing element 97 is disposed between the cover 96 and the lower face 91 of the tube 88.

Referring once more to FIGURE 2 it will be seen that the circuits previously described provide for the deflection of the cathode ray beam of the oscilloscope for each impingement of a gamma ray 73; and for the unblanking and blanking of the cathode ray beam, the Z terminal of the oscilloscope is connected to the four computor input leads 47, 41, 61 and 54, as through parallel connected summing resistors 98, 99, 100 and 101 and across a grounded resistor 102, to a series-connected pulse height selector 103 and amplifier 104. Thus the signals from all of the elements are summed to provide a Z terminal signal corresponding in strength to the total energy of the beam, and varying in proportion with the energy of the incident gamma ray 73. The pulse height selector 103 is adjusted to produce an unblanking signal to the oscilloscope only when a stimulus of the desired energy range impinges on the scintillator 77, and sensings of stimuli other than those desired are avoided.

I claim:
1. A beam positon identification means comprising, a beam target area composed of a plurality of adjacent beam excitable electric signal producing elements, said elements being further defined in regularly interspersed pairs of X and Y elements and each pair consisting of a plus and a minus element, means producing a beam directed upon said target area having a size energizing at least one pair of X elements and one pair of Y elements, the elements in each X pair being particularly formed and connected to produce signal components which vary in relation to each other as a function of position of said beam along an X coordinate axis and the elements in each Y pair being particularly formed and connected to produce signal components which vary in relation to each other as a function of position of said beam along a Y coordinate axis.

2. A beam position identification means comprising, a plurality of adjacent beam responsive electric signal producing elements distributed over a beam target area, and electric circuit means connecting a certain first group of said elements to produce a first coordinate signal therefrom, said electric circuit means connecting a certain second group of said elements to produce a second coordinate signal therefrom, the elements making up said first and second groups being intermixed over said area with the elements of one group having a progressive change in width along one coordinate of said area and the elements of the other group having a progressive change in width along a perpendicular coordinate whereby said signals will correspond in strengths to the coordinates of the position of said beam on said target area.

3. In a beam position identification means, a beam target composed of a plurality of adjacent beam excitable electric signal-producing interspersed X and Y elements corresponding with X and Y rectangular coordinates for defining beam position on said target, said X elements being elongated in the direction of said Y coordinate and differing progressively in width along said X coordinate, and each of said Y elements being formed with converging sides to provide a progressively varying width along said Y coordinate.

4. A beam position identification means comprising, a beam target area composed of a plurality of adjacent beam excitable electric signal producing elements, said elements being further defined in regularly interspersed pairs of X and Y elements corresponding with X and Y rectangular coordinates for defining beam position on said target area, each of said pairs consisting of a plus element and a minus element, means producing a beam directed upon said target area having a size energizing at least one pair of X elements and one pair of Y elements, said X elements being elongated in the direction of said Y coordinates and differing progressively in width along said X coordinate so as to produce plus and minus signal components which vary in relation to each other as a function of position of said beam along said X coordinate, and the elements in each Y pair being formed as mating triangles to provide progressively varying widths along said Y coordinate thereby producing plus and minus signal components which vary in relation to each other as a function of position along said Y coordinate.

5. A target responding to radiation stimuli and comprising, a scintillator for accepting said stimuli at various points and functioning to emit a surge of light in response thereto; a photocathode adjacent said scintillator and functioning to receive said light and to emit a beam of charged particles; and a beam target in the path of said beam and composed of a plurality of interspersed X and Y beam excitable electric signal producing elements corresponding with X and Y rectangular coordinates for defining beam position on said target, said elements being particularly formed and connected to produce signal components which vary in relation to each other as a function of position of said beam along said X and Y coordinates.

6. A beam position identification means comprising, a scintillator for accepting radiation stimuli at various points and functioning to emit a surge of light in response thereto; a photocathode adjacent said scintillator and functioning to receive said light and to emit a beam of charged particles; and a beam target in the path of said beam and composed of a plurality of interspersed X and Y beam excitable electric signal producing elements corresponding with X and Y rectangular coordinates for defining beam position on said target, charged-particle multiplying means positioned between said photocathode and said target, said elements being particularly formed and connected to produce signal components which vary in relation to each other as a function of position of said beam along said X and Y coordinates, and an electric circuit connected to said elements and receiving said signal components therefrom and including an oscilloscope connected to display a point image corresponding in position to each stimuli incident in said scintillator.

References Cited by the Examiner
UNITED STATES PATENTS

| 2,465,277 | 3/49 | Schafer | 313—73 X |
| 2,789,193 | 4/57 | Anderson. | |
| 2,877,284 | 3/59 | Schultz | 313—95 X |
| 2,895,067 | 7/59 | De Loffre | 313—95 |
| 2,910,592 | 10/59 | Armistead | 250—71.5 |

GEORGE N. WESTBY, *Primary Examiner.*

RALPH G. NILSON, *Examiner.*